July 24, 1928.
J. C. ERICKSEN
1,677,959
FLUID PRESSURE CONTROL DEVICE
Filed Sept. 15, 1927  2 Sheets-Sheet 1
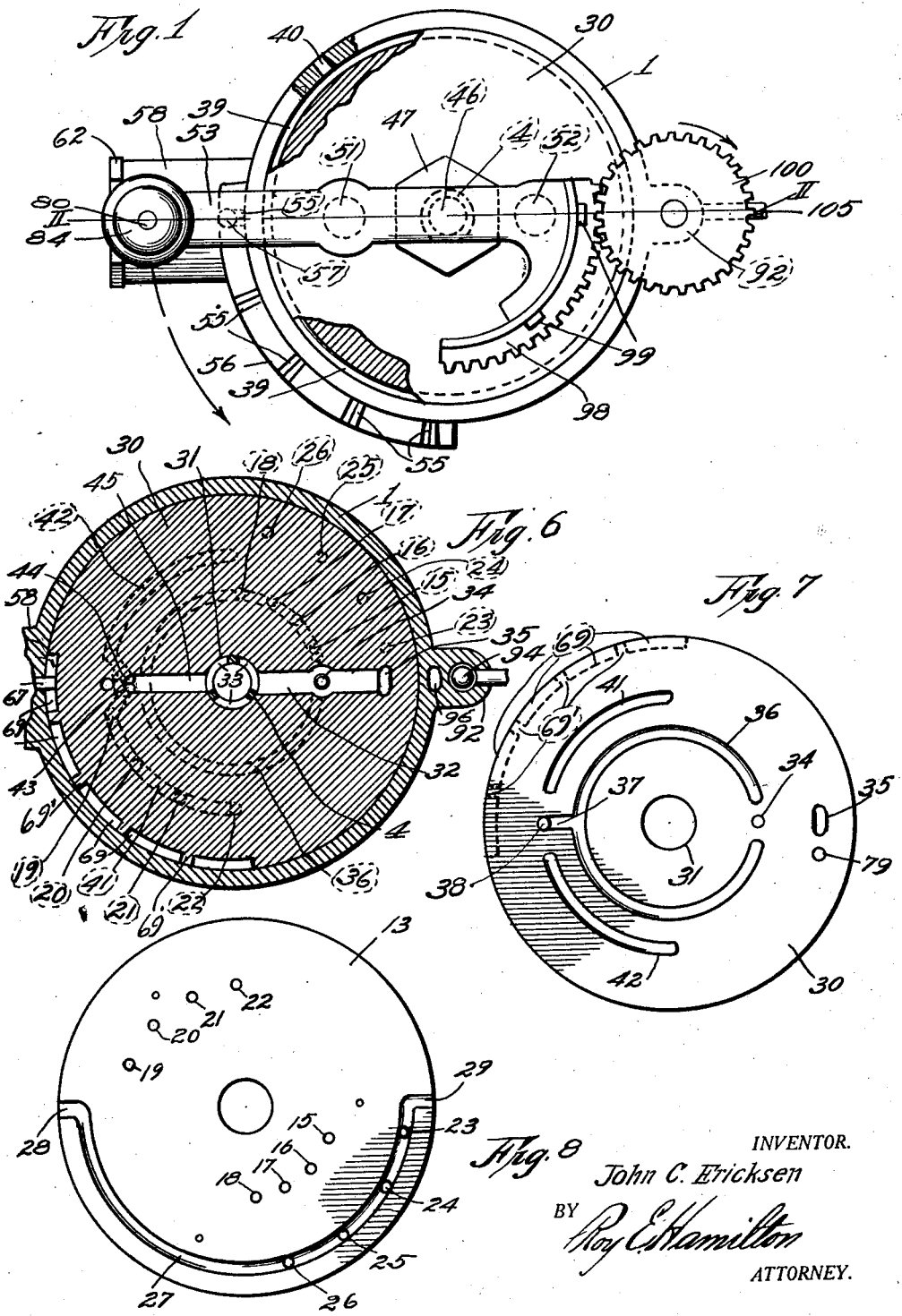
INVENTOR.
John C. Ericksen
BY Roy E. Hamilton
ATTORNEY.

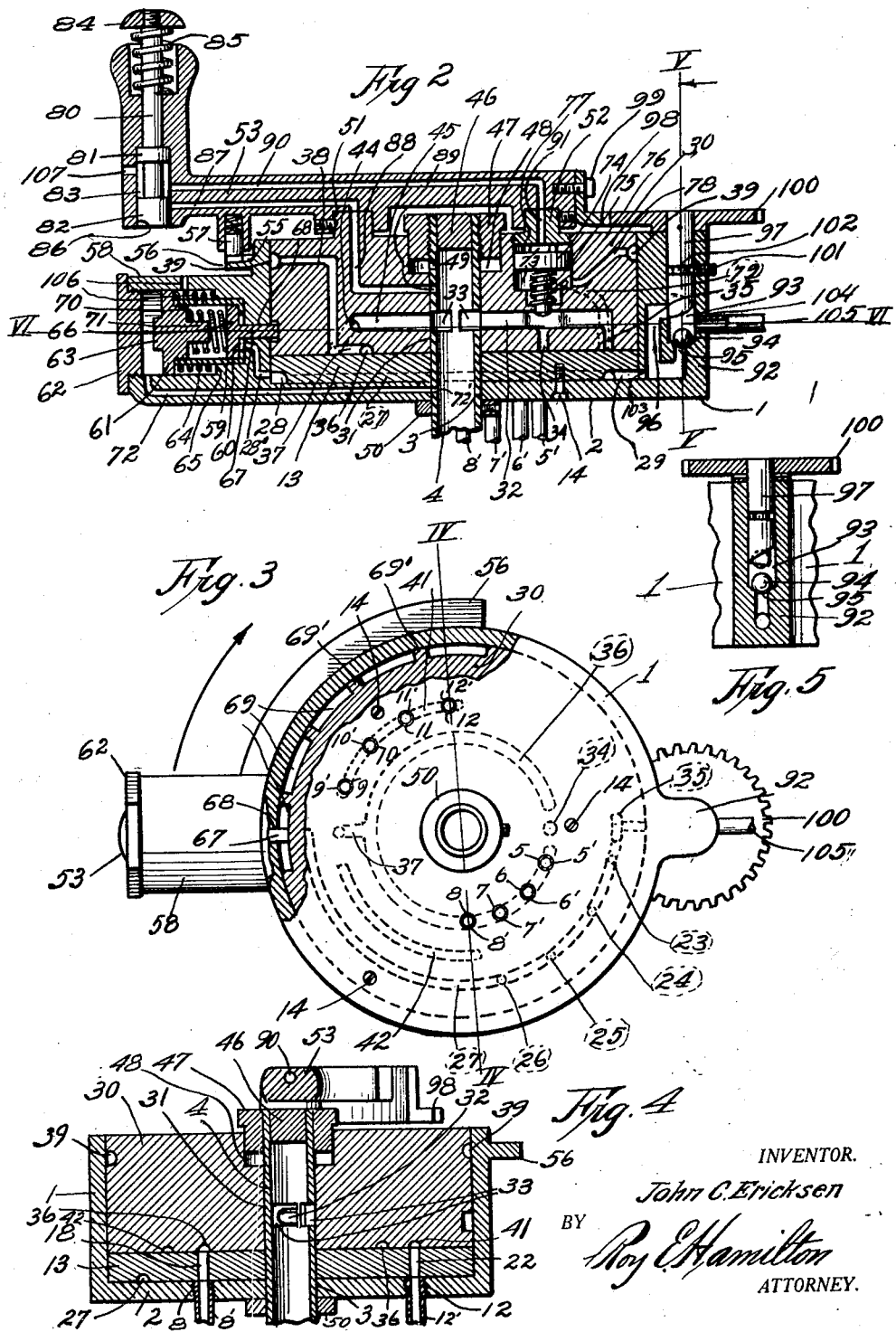

Patented July 24, 1928.

1,677,959

UNITED STATES PATENT OFFICE.

JOHN C. ERICKSEN, OF FALLS CITY, NEBRASKA.

FLUID-PRESSURE-CONTROL DEVICE.

Application filed September 15, 1927. Serial No. 219,658.

This invention relates to improvements in pressure fluid control devices, and particularly to devices of this character for the control of the clutch and transmission of a motor vehicle in which the operation of said clutch and transmission depend upon pressure fluid.

The object of this invention is to provide a device for the control of pressure fluid which will progressively or selectively control the supply of pressure fluid to and the exhaust from a pressure fluid operated machine.

Another object is the provision in a pressure fluid control device, of an automatic means for restricting the movement of the valve from one position to another.

Further objects are simplicity of construction, ease of manipulation and accuracy of operation.

Other objects will appear in the following detailed specification, reference being had to the accompanying drawings, in which Figure 1, is a plan view of a pressure fluid control device, partly broken away, embodying this invention.

Fig. 2, is a vertical central section taken on line II—II of Fig. 1.

Fig. 3, is an inverted plan of the device partly broken away.

Fig. 4, is a vertical section taken on line IV—IV of Fig. 3.

Fig. 5, is a fragmentary view taken on line V—V of Fig. 2.

Fig. 6, is a horizontal section partly broken away, taken on line VI—VI of Fig. 2.

Fig. 7, is an inverted plan view of the rotor, and

Fig. 8, is an inverted plan view of the port disc.

Similar reference characters refer to like parts thruout the several views, and the numeral 1 designates a cylindrical casing having a fixed end member 2 provided with an opening 3 in which is axially mounted a pipe 4 extending thru the cylindrical casing 1, and serving as a feed pipe for pressure fluid from any suitable source, not shown, to be distributed to the various pipes which will hereinafter be fully described. End member 2 is provided with two series of openings 5, 6, 7 and 8, and 9, 10, 11 and 12, the openings of each series being equally spaced on a circle concentric with said pipe 4, said circles being spaced apart. The circular degrees between adjacent holes of both series are equal, but the two series may be spaced apart to best suit conditions. The openings 5, 6, 7, 8, 9, 10, 11 and 12 are fitted with outwardly extending pipes 5', 6', 7', 8', 9' 10', 11' and 12', respectively.

In order to facilitate the manufacture of this device, a port disc 13 is tightly fitted in casing 1, and securely attached to end member 2 by means of screws 14, and is provided with two series of ports 15, 16, 17 and 18, and 19, 20, 21, and 22, which register with openings 5, 6, 7, 8, 9, 10, 11 and 12, respectively. Disc 13 is also provided with series of equally spaced ports 23 24, 25 and 26, which is concentric with the pipe 4 and the ports are so spaced apart that the angular distance between them is equal to that of series 5, 6, 7 and 8. A semi-circular groove 27, having radial extensions 28 and 29, which communicate with the outer periphery of said disc, serves to connect all of the series of ports 23, 24, 25 and 26, adjacent the end member 2. It is evident that these ports and grooves could be made in the casing if port disc 13 and the casing 1 were integral.

A rotor 30 inside the casing 1 has a central opening 31 thru which the pipe 4 is fitted. A transverse passage 32 in the body of the rotor 30 is in constant communication with the holes 33 in pipe 4, and is provided with branch passages 34 and 35 which communicate with the series of ports 5, 6, 7 and 8, and 23, 24, 25 and 26, respectively, as the rotor is moved.

Referring to Fig. 7, 36 is a partial annular groove in the lower side of the rotor, and so positioned as to communicate with all the ports 15, 16, 17 and 18, when the rotor is in normal position as shown in the drawings. A transverse passage 37 from said groove 36 is in communication with an irregular passage 38, which communicates with an annular groove 39 located in the outer periphery of rotor 30, and which in turn connects with the atmosphere thru the hole 40 in casing 1. Passage 34 is positioned equi-distant from the adjacent ends of groove 36, and is in alignment with the same.

41 and 42 are grooves in the under side of the rotor, concentric with the groove 36, and in communication with the supply pipe 4 thru the passages 43 and 44, respectively, which connect with the lateral passage 45 which is in constant communication with holes 33 in said pipe. The adjacent ends of grooves 41 and 42 are equally spaced from passage 38, and are in alignment therewith.

The upper end of pipe 4 is securely closed by means of the plug 46, and has external threads thereon adapted to engage the threads of an internally threaded plug 47, which is adapted to fit part way into a cylindrical chamber 48 in the rotor, 30, thus forming a closed chamber into which pressure air is admitted from the supply pipe 4 thru the hole 49 to securely hold the parts 30, 13 and 1 in air tight relation. Pipe 4, which is tightly fitted into end member 2, is further secured against longitudinal movement by set collar 50.

The rotor 30 is provided with diametrically opposite bosses 51 and 52, to which a handle 53 is securely attached by means of set screws 54. A series of notches 55, in an annular flange 56 which is integral with, and located on the outer periphery of said casing, co-operate with a spring latch 57 carried by the handle to hold the rotor in its various desired positions, which will hereinafter be fully set forth.

Referring to Fig. 3, which best shows the relation of ports and grooves, the face of the rotor between the adjacent ends of groove 36 is not of sufficient extent to overlap on a port from which the passage 34 moves until said passage has been brought into partial register with the next opening of the series. This conditon exists regardless of which direction it is moved since the passage 34 is positioned centrally between the adjacent ends of groove 36, therefore, it is possible to release fluid pressure in one of the pipes of the series before pressure is admitted into another pipe, since the groove 36 will permit the exhaust of the adjacent pipe thru the exhaust passages. Therefore, it is impossible to have pressure on more than one of the pipes of series 5′, 6′, 7′ and 8′ at the same time.

The two series of ports 15, 16, 17 and 18, and 19, 20, 21 and 22 are so positioned in relation to the passages 34 and 38, respectively, that when passage 34 registers with port 15, passage 38 will register with port 19, and so on thru the corresponding ports of the series.

If the device is in a set operative position, it will be noted that when the passage 38 is set to register with one of the pipes of series 9′, 10′, 11′ and 12′, say on 11′, then all of the remaining pipes will be in connection with the pressure fluid pipe 9, pipe 9′ and 10′ communicating with groove 42, which connects with pipe 4 by passages 43 and 45 and port 12 connects with groove 41, which in turn connects with pipe 4 thru passages 44 and 45. In the setting as stated above, passage 34 will be in register with pipe 7′ of the series 5′, 6′, and 7′ and 8′, thus connecting 7′ with the pressure fluid pipe. Thruout all the set positions of the device, one pipe of the series 5′, 6′, 7′ and 8′ will be in communication with the pressure fluid pipe, and all the remaining pipes of the series will be open to the exhaust, at the same time one of the series of pipes 9′, 10′, 11′ and 12′ will be in communication with the exhaust and all the remaining pipes of this series will be in communication with the pressure fluid pipe 4.

In order to prevent a continuous movement from one registering position as just above described, to any other registering position, an automatic governing device is provided. This device is contained within a cylindrical housing 58, which is positioned on the outside of casing 1, and integral therewith. Slidably mounted in housing 58 is an auxiliary housing 59 having an opening 60 in one end, and the other end being provided with a flanged plug 61. Housing 58 is provided with a screw plug 62 which serves to close housing 58, and is adapted to engage the hexagonal projection 63 of the plug 34 when housing 32 is in its extreme outer position, where it is normally held by the spring 64 positioned in housing 58 between plug 61 and a shoulder 65 formed in housing 58. In Fig. 2, the spring 64 is shown compressed which would be the case when the pressure fluid is acting on the upper surface of plug 61. Slidably mounted in auxiliary housing 59 is a piston 66 having a stem 67, extending thru opening 60 in housing 59, and also thru opening 68 in casing 1, to enter recesses 69 located in the outer periphery of rotor 30. The recesses 69 are equally spaced apart by means of the partitions 69′ which serve as abutments for the stem 67 to limit the movement of the rotor when said stem is in any one of the recesses. Interposed between plug 61 and piston 60 is a tension spring 70 which normally holds stem 68 in operative relation with recesses 69. Communicating with the lower side of piston 66 thru the opening 60 in housing 59 is a passage 28′ which connects with passage 28 in the rotor. Plug 61 is provided with an inwardly extending portion 71 which serves to limit the outward movement of piston 60 when said piston is in the disengaged position.

As shown in Fig. 2, plug 61 has been moved away from plug 62, due to pressure fluid which enters the chamber between said plugs by way of passage-way 72 which communicates with pipe 4 thru opening 72′ in said pipe. This movement of plug 61 causes the housing 59 to move inwardly to engage casing 1, thus permitting the stem 68 to enter the recesses 69 in rotor 30. As long as the pressure fluid remains on plug 61 with sufficient force to overcome spring 64, housing 59 will be held in its inner positon, and not until the pressure fluid is removed by cutting off the supply in pipe 4 will housing 59 move to its outer position.

In alignment with lateral passage 54 and mounted in chamber 73 in the rotor 30, and which is closed by means of a screw plug 77, is a piston 74 having a stem 75, which is adapted to close passage 34. Interposed between the lower surface of piston 74 and rotor 30 is a tension spring 76 which tends to move piston 74 to its outer position, as shown in Fig. 2. Communicating with the inner side wall of chamber 73 are two passages 78 and 79 which connect respectively with the annular exhaust groove 39 and with the ports 23, 24, 25 and 26 as the rotor is moved Slidably mounted in handle 53 and extending beyond one end thereof, is a piston stem 80, which is provided at its inner end with two spaced apart pistons 81 and 82, thus forming a chamber 83. An atmosphere port 107 communicating with chamber 83 is provided in handle 53, said port being open when the pistons are in the raised position and closed when said pistons are in the lowered position. The upper end of stem 80 is provided with a push button 84 securely attached to said stem and serving as an abutment for a tension spring 85, which normally holds stem 80 in its outer position. The pistons 81 and 82 are adapted to slide in a cylindrical cavity 86, which is formed in the handle 53. Piston 82 fits snugly within said cavity, and when in its normal position is adapted to close a passage-way 87 in handle 53 which communicates with another passage 88 located in rotor 30 and connecting with hole 89 in pipe 4. Communicating with cavity 86 between passage-way 87 and the piston 81 is a passage-way 90 in the handle 53, which extends to and communicates with the chamber 73 thru a hole 91 in cap 77. When the operator presses the button 84, thus moving pistons 81 and 82 downward against the action of spring 85, both passage-ways 87 and 90 will communicate with chamber 83, thus permitting air pressure from pipe 4 to pass thru passage-way 87 into cavity 83, thence thru passage-way 90 to the chamber 73 between plug 77 and the piston 74. This air pressure will force the piston 74 downwardly until the lower portion of stem 75, which is tapered to form a suitable closure for passage 34, closes said passage, thus cutting the flow of compressed air off therefrom. Also when 75 closes passage 34, the piston 74 will completely close passages 78 and 79.

A boss 92 located on the outer periphery of the casing 1, is provided with a cavity 93 parallel with the axis of the rotor 30. The cavity 93 has a sloping bottom, in the center of which a valve ball 94 gravitates into position to close the port 95. A by-pass 96 is capable of regulation by the rotary valve 97 which is adapted to almost close said by-pass when the handle 53 is in the normal position, as shown thruout the several views, and will gradually increase the opening to said by-pass as the handle is rotated in the direction as indicated by the arrow in Fig. 1. An operable means for regulating the rotary valve 97 consists of a segmental gear 98 securely attached to handle 53 by means of screws 99, a pinion 100 mounted on rotary valve member 97, and in operable relation with segment 98 serves to rotate the rotary valve member in the direction as indicated by the arrow in Fig. 1. To prevent longitudinal movement of rotary valve member 97, a screw 101 is mounted in the casing 1, adapted to engage annular groove 102 in the rotary valve member 97. By-pass 96 and port 95 are in direct communication with groove 27 thru opening 103 in casing 1 and passage 29 in the rotor. Casing 1, is provided with an opening 104 which communicates with the chamber 93 between the ball valve 94 and the rotary valve 97, and is adapted to receive a pipe 105. This ball valve and rotary valve with their connections to the supply pipe 4 and exhaust port 40, as hereinbefore described, serve to permit a free flow of air to pipe 105, and also to restrict the exhaust from said pipe.

To permit free movement of the pistons 66 and 61, the spring chambers have been provided with openings 106 which communicate with the atmosphere.

*Operation.*

Assuming the desire to move the rotor so that the passage 34 registers with pipe 5 from the neutral, non-operative position as shown in the several views of the drawing.

Presume air is fed to the supply pipe 4 from any suitable source, not shown, and in order to obtain the desired registration it is necessary that the operator move the handle 53 in the direction indicated by the arrow in Fig. 1, until the latch 57 registers with the next succeeding notch 55 which is accomplished in the following manner: The operator first moves the lever 53 until the stem 67 engages the partition 69′ at which time the exhaust port 79 will be closed and the passage 35 will register with port 23, thereby permitting a flow of pressure air from the supply pipe 4 thru openings 33 and passages 32 and 35, thence thru port 23, grooves 27 and 28 and passage 28' against the inner side of piston 66 which will move said piston outwardly against the action of tension spring 70, thus causing the withdrawal of stem 67 from recess 69. The operator can then continue the movement of the handle 53 until the latch 57 engages the next notch 55.

As the handle is thus moved forward passage 35 and port 23 are moved out of register, and the exhaust passage-way 79 which has been moved out of register with port 23 will move into register with port 24, thus permitting the exhaust of pressure fluid from piston 66 and permitting spring 70 to force the stem 67 into the next succeeding recess 69.

Due to the spacing of the notches 55, which determine the position of the rotor by engagement with the latch 57, the stem 67 when in one of the recesses will be positioned in the central portion thereof, thus permitting the movement of the handle in either direction before the stem 67 will engage a partition 69'. This arrangement is necessary to allow the registering of ports in either direction.

Port 15 is so positioned from the neutral position of passage 34, that when handle 53 has been moved forward one tooth as described above, it will register with passage 34, likewise, exhaust port 19 will register with passage 37. Due to the spacings of the ports of the series as described above, this same relation of co-acting ports will exist thruout the entire series.

It will be noted that whenever passage 35 registers with any one of the ports 23, 24, 25 or 26, the exhaust passage 79 will be closed.

When the passage 34 is in register with one of the ports 15, 16, 17 or 18, and it is desired to move it to either of the next adjacent positions, the elongated passage 35, which is then positioned equi-distant from the two adjacent ports then in communication with the exhaust groove 36 may be moved to register with either of said ports, thereby releasing the rotor, as described above.

When it is desired to move the device from any given position to another position other than the next adjacent position, it is necessary that the pressure air to passage 34 be cut off while the said passage moves over the intermediate positions. In order to accomplish this, the operator presses the button 84 against the action of tension spring 85 so that the cavity 83 is in communication with both passages 87 and 90, thus permitting the pressure air from pipe 4 to pass thru the then open passages and chamber to engage the upper side of piston 74 to force it downwardly against spring 76, so that stem 75 will enter and close passage 34, At the same time the piston 74 closes the exhaust passage 79. The operator then moves the handle 53 the first initial movement, and the passage 35 will register with one of the ports 23, 24, 25 and 26, thereby permitting the release of the rotor 30 in the same manner as described above.

Then the rotor may be moved to any desired position since the exhaust 79 is closed, and the stem 67 will be held in the released position. Also, since the passage 34 is closed, by means of the stem 75, no pressure fluid will pass into any of the series of ports 15, 16, 17 and 18. When the operator has moved the rotor to the desired position, the button 84 is released, thus releasing the air pressure on valve 74, which will permit the spring 76 to force the valve outwardly to open passage-way 34, and also exhaust port 79, when the device will operate in the usual manner, as described above.

The pipe 105 is charged thru passage 29, opening 103, port 95 and cavity 93, and is exhausted thru cavity 93, by-pass 96, opening 103 and passage 29. These two operations are performed by the moving of the rotor as described above. The principal feature of this part of the device is the adjustment of the by-pass valve as the rotor is moved in the direction as indicated by the arrow. As the rotor is thus moved, the valve 97 will be rotated thru the intermediacy of the gears 98 and 100, so that from a nearly closed position, when the rotor is in normal position, it will gradually move to fully open by-pass 96, thus gradually increasing the exhaust opening of pipe 105, as the handle is advanced.

I do not limit this invention to the structure shown and described, as many modifications within the scope of the appended claims may be made without departing from the spirit thereof.

Having thus described this invention, what is claimed as new and desired to be secured by Letters Patent is:

1. A pressure fluid control device comprising a casing having two series of correlated ports, a pressure fluid supply pipe connecting with said casing, a rotor, movable in said casing, having elongated and restricted exhaust and inlet passages, a handle for moving said rotor to and from its neutral and operative position and an elongated exhaust passage and restricted inlet passage adapted to communicate with one of said series of ports and an elongated inlet passage and restricted exhaust passage adapted to engage the other of said series of ports.

2. A pressure fluid control device comprising a casing having two series of correlated ports, a pressure fluid supply pipe communicating with said casing, a rotor, movable in said casing, having exhaust passages and inlet passages, means for moving said rotor to and from its neutral and operative positions, all of the ports of one of said series of ports and all the ports of the other of said series of ports being in communication with said exhaust passages and inlet passages respectively when the rotor is in its neutral position, and means, including said rotor, whereby the correlated ports of the two series may be successively or selectively connected with the opposite passages, with which they are in communication when the rotor is in the neutral position, as the rotor is moved to the various operative positions.

3. A pressure fluid control device comprising a casing having two series of correlated ports, a pressure fluid supply pipe communicating with said casing, a rotor, movable in said casing, having exhaust passages and inlet passages, means for moving said rotor to and from its neutral and operative positions, means for automatically interrupting the movement of said rotor as it is moved from one position to another, all the ports of one of said series of ports and all the ports of the other series of ports being in communication with said exhaust passages and inlet passages respectively when the rotor is in its neutral position, and means, including the rotor, whereby the correlated ports of the two series may be successively or selectively connected with the opposite passages, with which they are in communication when the rotor is in the neutral position, as the rotor is moved to its various operative positions.

4. A pressure fluid control device comprising a casing having two series of correlated ports, a pressure fluid supply pipe communicating with said casing, a rotor, movable in said casing, having exhaust passages and inlet passages, means for moving said rotor to and from its neutral and operative positions, means operable by pressure fluid for automatically interrupting the movement of said rotor as it is moved from one position to another, all the ports of one of said series of ports and all the ports of the other of said series of ports being in communication with said exhaust passages and inlet passages respectively when the rotor is in its neutral position, and means, including the rotor, whereby the correlated ports of the two series may be successively or selectively connected with the opposite passages, with which they are in communication when the rotor is in the neutral position, as the rotor is moved to its various operative positions.

5. A pressure fluid control device comprising a casing having two series of correlated ports, a pressure fluid supply pipe communicating with said casing, a rotor movable in said casing and having inlet and exhaust passages, means for moving said rotor to and from its various operative positions, an opening in said casing adapted to be successively placed in communication with said exhaust and inlet passages, and means for increasing and decreasing the exhaust passage to said opening as the rotor is moved respectively from and to its neutral position.

6. A pressure fluid control device comprising a casing having two series of coacting ports, a pressure fluid supply pipe communicating with said casing, a rotor movable in said casing having exhaust and inlet passages adapted to cooperate with said ports, a handle by which said rotor is moved to and from its neutral and operative positions, and a manually controlled means adapted to close the inlet passage to one of said series of ports.

7. A pressure fluid control device comprising a casing having two series of correlated ports, a pressure fluid supply pipe communicating with said casing, a rotor movable in said casing having exhaust and inlet passages adapted to cooperate with said ports, means for moving said rotor to and from its various positions, means for interrupting the movement of said rotor as it is moved from one position to another, and manually controlled means adapted to close the inlet passage to one of said series of ports and simultaneously to maintain said interrupting means in an inoperative position.

8. A pressure fluid control device comprising a casing having two series of correlated ports, a pressure fluid supply pipe communicating with said casing, a rotor movable in said casing having exhaust and inlet passages adapted to cooperate with said ports, means for moving said rotor to and from its various positions, means of interrupting the movement of said rotor as it is moved from one position to another, one port of each series of ports being adapted to communicate successively or selectively with like passages of the other series while all the remaining ports of each series are in communication with exhaust and inlet passages respectively, as the rotor is moved.

9. A pressure fluid control device comprising a casing having two series of correlated ports, a pressure fluid supply pipe communicating with said casing, a rotor movable in said casing having exhaust and inlet passages adapted to cooperate with said ports and supply pipe, means for moving said rotor to and from its various positions, means of interrupting the movement of said rotor as it is moved from one position to another, and an opening in said casing adapted to be successively placed in communication with said exhaust and inlet passages, and means for increasing and decreasing the exhaust passage to said opening as the rotor is moved respectively from and to its neutral position.

10. A pressure fluid control device comprising a casing having two series of correlated ports, a pressure fluid supply pipe communicating with said casing, a rotor movable in said casing having exhaust and inlet passages adapted to cooperate with said ports, a handle by means of which said rotor is moved to and from its various positions, and a means operable by pressure fluid from said supply pipe for holding said rotor and casing in operable position.

In testimony whereof, I hereunto affix my signature.

JOHN C. ERICKSEN.